United States Patent
Maruyama et al.

(10) Patent No.: US 7,661,946 B2
(45) Date of Patent: Feb. 16, 2010

(54) INJECTION MOLDING MACHINE HAVING A SCREW EQUIPPED WITH A CHECK RING

(75) Inventors: Junpei Maruyama, Yamanashi (JP); Akira Oomori, Yamanashi (JP); Satoshi Takatsugi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 240 days.

(21) Appl. No.: 11/877,974

(22) Filed: Oct. 24, 2007

(65) Prior Publication Data

US 2008/0305201 A1    Dec. 11, 2008

(30) Foreign Application Priority Data

Jun. 5, 2007    (JP)    ............... 2007-149778

(51) Int. Cl.
B29C 45/77    (2006.01)
B29C 45/80    (2006.01)

(52) U.S. Cl. ............... 425/145; 425/149; 425/150

(58) Field of Classification Search .............. 425/145, 425/149, 150
See application file for complete search history.

(56) References Cited

U.S. PATENT DOCUMENTS 5,153,149 A    10/1992    Naito et al.

7,556,753 B2 *    7/2009    Uchiyama et al. ........... 425/125

FOREIGN PATENT DOCUMENTS

| JP | 62-003916 A | 1/1987 |
| JP | 1-168421 A | 7/1989 |
| JP | 01-281912 A | 11/1989 |
| JP | 04-028519 A | 1/1992 |
| JP | 04-263917 A | 9/1992 |

* cited by examiner

*Primary Examiner*—Tim Heitbrink
(74) *Attorney, Agent, or Firm*—Lowe Hauptman Ham & Berner LLP

(57) ABSTRACT

When the screw moves forward, resin backflow occurs. The backflow acts on the screw, applying torque to the screw. During forward movement of the screw, screw torque is produced as shown in FIG. 3A if the check ring is not worn, or as shown in FIG. 3B if the check ring is worn, because wear increases the backflow and delays the closure of the check ring. The magnitude of the peak screw torque and the associated time and screw position vary depending on the presence or absence of wear, so wear of the check ring is estimated from variations in these physical quantities. The state of wear of the check ring, screw head, check seat, and other parts inside the barrel can be estimated.

16 Claims, 6 Drawing Sheets

WHEN NOT WORN

WHEN WORN

WHEN NOT WORN

WHEN WORN

WHEN NOT WORN

WHEN OUTER CIRCUMFERENCE IS WORN

WHEN END FACE IS WORN

WHEN FLIGHT IS NOT WORN

WHEN FLIGHT IS WORN

WHEN OUTER CIRCUMFERENCE IS NOT WORN

WHEN OUTER CIRCUMFERENCE IS WORN

INJECTION MOLDING MACHINE HAVING A SCREW EQUIPPED WITH A CHECK RING

BACKGROUND OF THE INVENTION

1. Field of the Invention

The present invention relates to an injection molding machine that has a screw equipped with a check ring and is configured for detection of the state of wear of the check ring, screw, inner wall of the barrel, and so on.

2. Description of the Related Art

An injection molding machine stores molten resin in a front space inside the barrel and injects the molten resin into a mold by forward motion of a screw or plunger. In an injection molding machine of the in-line screw type, the screw is rotated, the resin is melted, the molten resin is fed forward to the space in front of the screw while the pressure of the resin moves the screw backward, the quantity of resin is thereby measured, and the screw is then moved forward to inject the molten resin into the mold. In this type of injection machine, the screw is equipped with a check ring near its front end to prevent backflow of resin during injection.

FIG. 1 illustrates an exemplary conventional check ring mechanism. The screw 1, which is inserted into the barrel 7, has a screw head 2, a check ring 3, movable in the axial direction of the screw 1, disposed in a section with a reduced diameter between the screw head 2 and the main body of the screw 1, and a check seat 4, disposed adjacent to the main body, that is brought into tight contact with the check ring 3 to close the resin path.

In the metering process, as the screw 1 rotates, resin pellets 8 are supplied from the rear end of the screw 1 and melted by both the shearing heat generated by rotation of the screw 1 and heat from a heater disposed outside the barrel 7 in which the screw 1 is inserted. The molten resin raises the resin pressure behind the check ring 3, producing a force pressing the check ring 3 forward. When the check ring 3 is pressed forward, the resin in the groove 6 behind the check ring 3 flows through a gap between the check ring 3 and the portion of reduced diameter into the space in front of the check ring 3, raising the pressure within the barrel 7 in front of the screw head 2.

When the resin pressure in front of the check ring 3 exceeds a predetermined pressure (the back pressure), the screw 1 is pressed backward to reduce the pressure in front of the check ring 3. The screw 1 continues to rotate, however, keeping the pressure behind the check ring 3 higher than the pressure in front of the check ring 3, so that the molten resin is continuously fed forward into the space in front of check ring 3. When the screw 1 has retreated to a predetermined distance (the measurement position), the rotation of the screw 1 is stopped and the metering process ends.

Next, the injection process starts. The screw 1 moves forward (from right to left in FIG. 1) to inject the resin into the mold. The resin pressure in front of the screw head 2 is thereby raised, so the check ring 3 is pressed backward and brought into tight contact with the check seat 4, closing the resin path and thus preventing backflow of the molten resin in the direction opposite to the advance of the screw.

Resin backflow from the front to the back of the check ring 3 occurs after injection starts and continues until the check ring 3 closes the resin path. This backflow occurs both through the resin path and through the gap between the outer circumference of the check ring 3 and the inner circumference of the barrel 7. When the injection molding machine is used over a long period of time, the check ring 3 and barrel 7 become worn and the rate of backflow changes accordingly. The backflow rate affects the amount of resin filled into the mold and thus the quality of the molded article.

Various methods of detecting the amount of leaking resin (the backflow rate) are known. For example, the backflow rate may be detected on the basis of the distance or speed of forward movement of the screw during hold pressure to prevent molding faults or detect wear or other problems with the check ring (See Japanese Patent Applications Laid-Open No. 62-3916 and No. 1-281912).

When the outer diameter of the check ring is reduced due to wear or the inner diameter of the barrel is enlarged due to wear, the backflow rate increases as described above. Accordingly, the state of wear of the check ring and barrel can be estimated from the backflow rate. In the inventions disclosed in the above Patent Documents, in which the backflow rate is detected on the basis of the distance or speed of forward movement of the screw during hold pressure, it would appear that the state of wear of the check ring and barrel could be estimated from the detected backflow rate. Unfortunately, the molded article shrinks during hold pressure, causing the screw to move forward. The above methods can not determine whether the screw has moved forward due to backflow or due to shrinkage of the molded article, so they cannot detect the exact backflow rate, and cannot accurately estimate the state of wear of the check ring and barrel.

In other known techniques, a resin flow stopping means is provided between the mold gate section and a nozzle section to stop the resin flow and thus apply a predetermined pressure to enable detection of the backflow rate on the basis of the distance by which the screw moves forward (Japanese Patent Applications Laid-Open No. 4-28519 and No. 4-263917).

In the inventions disclosed in the above Patent Documents, the screw does not move forward due to shrinkage of the molded article, but a special mechanism is required to stop the resin flow.

If resin backflow occurs during forward movement of the screw 1 as shown in FIG. 1, the flight 5 of the screw 1 is pressed backward by a force corresponding to the resin pressure (injection pressure) This force F is composed of a force Fx acting in the axial direction of the screw (pressing the screw backward) and a force Fθ acting in the screw rotational direction (turning the screw in the direction opposite to the direction during metering). Thus, the backflow applies a screw torque Fθ corresponding to the injection pressure to the screw 1. In another known method, a check ring abnormality is detected when the screw torque Fθ exceeds a predetermined value (See Japanese Patent Application Laid-Open No. 1-168421).

In the invention disclosed in the above Patent Document, wear and other problems of the check ring can be detected on the basis of the screw torque due to resin backflow, but it is not possible to detect the current degree of wear of the check ring before a problem occurs or to predict the remaining life of the check ring from the current degree of wear.

SUMMARY OF THE INVENTION

The object of the present invention is to provide an injection molding machine having a screw equipped with a check ring, configured to enable estimation of the state of wear of parts inside the barrel without the need to stop the molding operation or demount the check ring.

In a first aspect of the present invention, an injection molding machine having a screw equipped with a check ring includes a screw equipped with a check ring, torque detecting means for detecting torque acting on the screw, and physical quantity detecting means for detecting a physical quantity related to injection molding. The injection molding machine further includes peak time detecting means for detecting the time at which the torque acting on the screw detected by the torque detecting means reaches a peak during forward movement of the screw, and wear state estimating means for estimating the state of wear of screw tip components and/or the inner wall of the barrel in which the screw is inserted, from the physical quantity detected by the physical quantity detecting means at the time of the peak of the torque detected by the peak time detecting means.

The wear state estimating means may calculate statistical variation, over predetermined molding cycles, in the physical quantity at the time of peak torque, and estimate the state of wear of the screw tip components and/or the inner wall of the barrel from the calculated variation.

In a second aspect of the present invention, an injection molding machine having a screw equipped with a check ring includes a screw equipped with a check ring and torque detecting means for detecting the torque acting on the screw. This injection molding machine further includes peak time detecting means for detecting the time at which the torque acting on the screw detected by the torque detecting means reaches a peak during forward movement of the screw, and wear state estimating means for estimating the state of wear of the screw tip components and/or the inner wall of the barrel on the basis of torque detected from detection of the peak of the torque by the peak time detecting means until the screw finishes moving forward.

This injection molding machine may further include physical quantity detecting means for detecting a physical quantity related to injection molding. When the torque from occurrence of the peak torque until the screw finishes moving forward is equal to or higher than a predetermined value, the wear state estimating means determines that wear on the outer circumference of the check ring and/or the inner wall of the barrel has increased and estimates the state of wear of the outer circumference of the check ring and/or the inner wall of the barrel from the physical quantity detected by the physical quantity detecting means at the time of peak torque. When the torque from occurrence of the peak of the torque until the screw finishes moving forward is lower than the predetermined value, the wear state estimating means determines that wear on the end face of the check ring and/or screw head has increased and estimates the state of wear of the end face of the check ring and/or screw head from the physical quantity detected by the physical quantity detecting means at the time of peak torque.

In a third aspect of the present invention, an injection molding machine having a screw equipped with a check ring includes a screw equipped with a check ring, torque detecting means for detecting the torque acting on the screw, and physical quantity detecting means for detecting a physical quantity related to injection molding. This injection molding machine further includes peak time detecting means for detecting the time at which the torque acting on the screw detected by the torque detecting means reaches a peak during forward movement of the screw, and display means for displaying the physical quantity detected by the physical quantity detecting means at the time of the peak of the torque detected by the peak time detecting means.

This injection molding machine may further include statistical variation calculating means for calculating statistical variation, over predetermined molding cycles, in the physical quantity at the time of peak torque, and the display means may display the calculated statistical variation.

In a fourth aspect of the present invention, an injection molding machine having a screw equipped with a check ring includes a screw equipped with a check ring and torque detecting means for detecting the torque acting on the screw. The injection molding machine further includes peak time detecting means for detecting the time at which the torque acting on the screw detected by the torque detecting means reaches its peak, value obtaining means for obtaining at least one of an average value of the torque detected from detection of the peak of the torque until the screw finishes moving forward, an integrated value of the torque detected from detection of the peak of the torque until the screw finishes moving forward, the torque after a predetermined time has elapsed from the occurrence of the peak of the torque, the torque when the screw has moved forward a predetermined distance after the peak torque, and the torque when the screw finishes moving forward, and display means for displaying the value obtained by the value obtaining means.

The physical quantity detecting means may be means for detecting a screw position and the physical quantity may be the screw position or the distance the screw moves from the time at which the screw starts moving forward until the time of the peak torque.

The physical quantity detecting means may be means for detecting elapsed time and the physical quantity may be the elapsed time from when the screw starts moving forward until the peak of the torque is detected.

The physical quantity detecting means may be torque detecting means and the physical quantity may be the torque, or torque integrated with respect to time since the screw starts moving forward until the time of the peak torque.

The physical quantity detecting means may be torque detecting means and the physical quantity may be torque integrated with respect to screw position from the point where the screw starts moving forward to the point of the peak torque.

The physical quantity detecting means may be resin pressure detecting means and the physical quantity may be resin pressure.

An injection molding machine according to the present invention comprises an injection member, such as plunger or screw, which has a flight and injects resin by moving forward inside a cylinder; torque detecting means for detecting torque acting on the injection member; and wear state estimating means for estimating a state of wear of the outer circumference of the injection member and/or the inner wall of the barrel from the torque detected by the torque detecting means. And the torque detecting means is adapted to detect the torque acting on the injection member during forward movement of the injection member.

In the injection molding machine having a screw equipped with a check ring according to the present invention, the state of wear of the check ring, inner wall of the barrel, screw, or plunger can be estimated without stopping the molding operation or disassembling the barrel, so it is possible to replace the check ring or other parts and prevent molding failures before the check ring has worn out.

BRIEF DESCRIPTION OF THE DRAWINGS

The above and other objects and features of the present invention will become apparent from the following description of embodiments with reference to the accompanying drawings, in which.

DETAILED DESCRIPTION OF THE PREFERRED EMBODIMENTS

Figure 1:
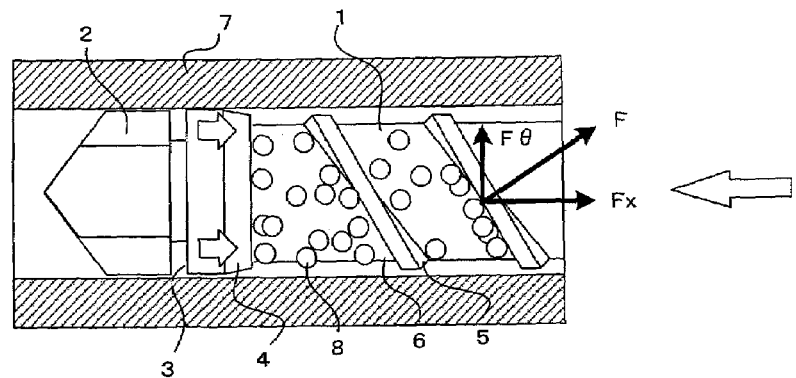
FIG. 1 illustrates an exemplary conventional check ring mechanism.
Figure 2:
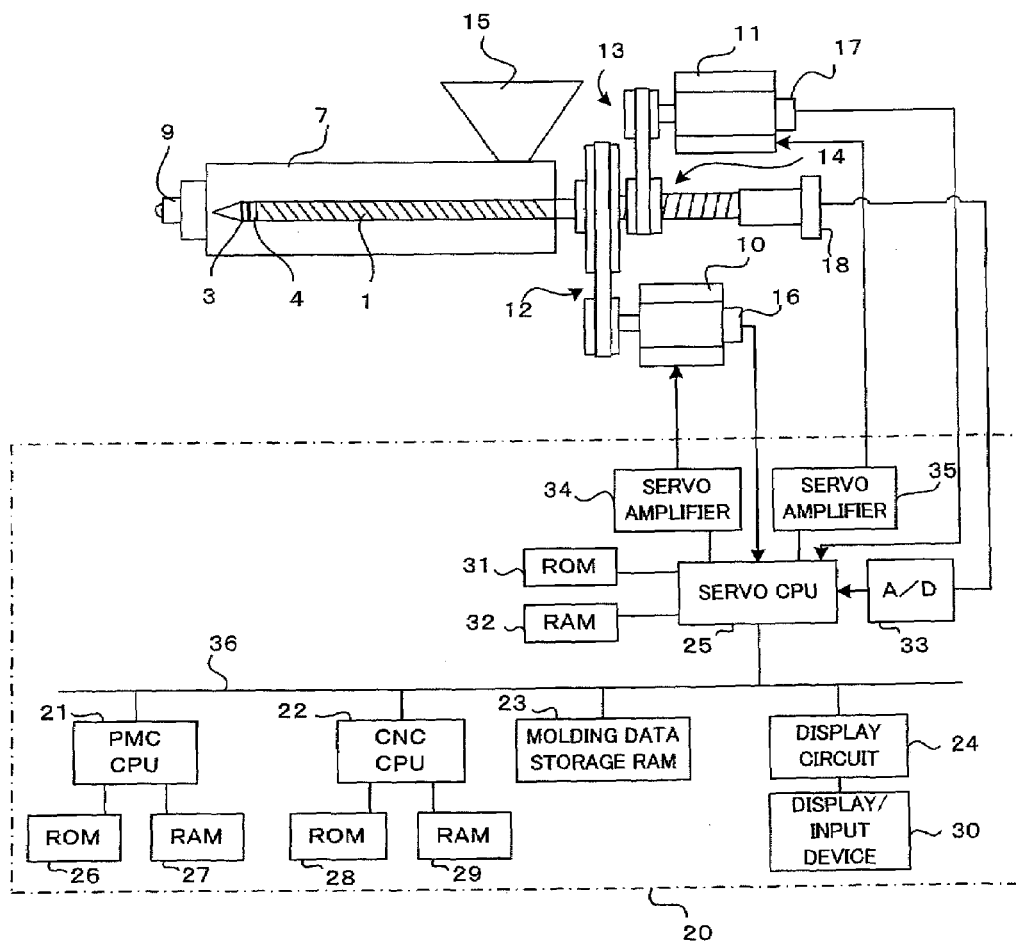
FIG. 2 is a block diagram showing the main sections of an injection molding machine in the embodiments of the present invention.

FIG. 2 is a block diagram showing the main sections of an injection molding machine in the embodiments of the present invention.

A barrel 7, in which a screw 1 is inserted, has a nozzle 9 at its front end and a hopper 15 near its rear end, through which resin pellets are supplied into the barrel 7. The screw 1 has at its front end a check ring mechanism including a check ring 3 and a check seat 4. The screw 1 is rotated driven by a screw rotating servo motor 10, acting as a rotational driving means, through a transmission mechanism 12 including a belt and pulleys. The screw 1 is also axially driven to control injection and back pressure by an injection servo motor 11, acting as a driving means for axially driving the screw 1, through a transmission mechanism 13 and a conversion mechanism 14 such as a ball screw and nut that converts rotational motion into rectilinear motion. The screw rotating servo motor 10 and injection servo motor 11 are equipped with respective position/speed detecting devices 16, 17 for detecting their position and rotational speed, so that the rotational speed, position in the axial direction, and velocity (injection speed) of the screw 1 can be detected. Furthermore, a pressure sensor 18 such as a load cell is provided to detect the pressure applied by the molten resin to the screw 1 in its axial direction, as the resin pressure.

A control unit 20 for controlling this injection molding machine is connected through a bus 36 to a CNC CPU 22, which is a microprocessor for numerical control, a PMC CPU 21, which is a microprocessor for a programmable machine controller (PMC), and a servo CPU 25, which is a microprocessor for servo control.

The PMC CPU 21 is connected to a ROM 26 where programs such as a sequence program for controlling the operation sequence of the injection molding machine is stored, and a RAM 27 for temporarily storing arithmetic data. The CNC CPU 22 is connected to a ROM 28 where programs such as an automatic operation program for controlling the injection molding machine as a whole is stored, and a RAM 29 for temporarily storing arithmetic data.

The servo CPU 25 is connected to a ROM 31 in which a control program dedicated to servo control for position, speed, and electric current loop processing is stored, and a RAM 32 for temporarily storing arithmetic data. The servo CPU 25 is also connected to a servo amplifier 34 for driving the screw rotating servo motor 10 according to commands from the CPU 25, and to a servo amplifier 35 for driving the injection servo motor 11 that drives the screw 1 axially for injection and other operations. The outputs of the position/speed detecting devices 16, 17 with which the servo motors 10, 11 are equipped are fed back to the servo CPU 25. The servo CPU 25 controls the motion of the servo motors 10, 11 through the servo amplifiers 34, 35 by performing position/speed feedback control according to commands delivered to respective axes from the CNC CPU 22 (to the screw rotating servo motor 10 and injection servo motor 11) and the position and speed information fed back from the position/speed detecting devices 16, 17, and also by performing electric current feedback control. A current position register is provided for obtaining the position of the screw 1 (position in its axial direction) after forward movement from the position feedback signal from the position/speed detecting device 17, so that the screw position can be detected by use of the current position register.

The resin pressure (applied to the screw) detected by the pressure sensor 18 is converted to a digital signal by an A/D converter 33 and input to the servo CPU 25. To detect the torque that is produced by resin backflow and causes the screw 1 to rotate, a well-known disturbance estimating observer is incorporated into the motion control processing performed by the screw rotating servo motor 10, and the disturbance estimating observer detects the torque applied to the screw 1 in its rotational direction.

Servo motors and servo amplifiers for driving a mold clamping mechanism and an ejector mechanism are also provided but they are not directly related to the present invention, so they are omitted in FIG. 2.

An input device 30 with a liquid crystal or CRT display is connected through a display circuit 24 to the bus 36. A molding data storage RAM 23 incorporating nonvolatile memory elements is also connected to the bus 36. The RAM 23 stores data related to injection molding, such as molding conditions, various settings, parameters, and macro variables.

In the above configuration, well-known digital servo processing takes place. More specifically, the PMC CPU 21 controls the operation sequence of the injection molding machine as a whole; the CNC CPU 22 distributes motion commands to the axis servo motors according to the operation programs in the ROM 28 and molding conditions and other data stored in the molding data storage RAM 23; and the servo CPU 25 performs conventional servo control such as position loop control, speed loop control, and current loop control according to the motion commands distributed to the axes (the servo motors associated with the driving axes, including the screw rotating servo motor 10 and injection servo motor 11) and the position, speed, and other feedback signals detected by the position/speed detecting devices.

The above configuration is not different from that of the control unit in conventional electrically-powered injection molding machines, except for an additional function for estimating the state of wear of the parts inside the barrel from the screw torque and other factors during forward movement of the screw.

First, a first embodiment of the injection molding machine having a screw equipped with a check ring according to the present invention will be described.

In the first embodiment, the state of wear of parts inside the barrel is estimated from a physical quantity at the time of peak screw torque due to resin backflow during forward movement of the screw 1.

As described above, resin backflow occurs when the screw 1 is moved forward in the injection and hold pressure process, or to close the check ring in the interval from completion of metering to the start of injection. This resin pressure due to backflow acts on the flight 5 of the screw 1, producing a screw torque proportional to the backflow rate. When the check ring 3 closes the resin path and stops the backflow through the resin path, only a slight backflow continues to occur through the gap between the outer circumference of check ring 3 and the inner wall of the barrel, so the screw torque is reduced. Thus, the time at which the screw torque reaches its peak represents the closure of the check ring 3.

Figure 3A:
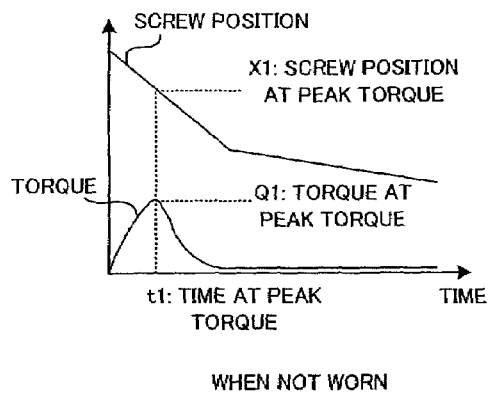
FIGS. 3A and 3B illustrate how the screw torque varies due to wear of screw tip components in the injection molding machine in the first embodiment of the present invention.
Figure 3B:
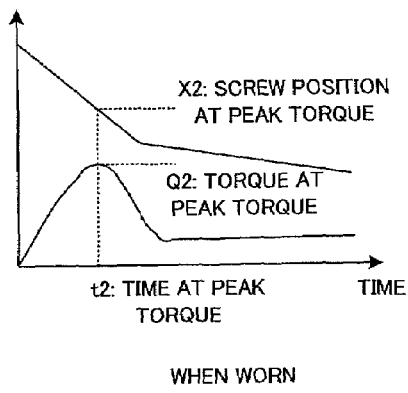

FIGS. 3A and 3B illustrate how the screw position X and screw torque Q vary as the screw moves forward. The horizontal axis is the time axis with the origin representing the starting point of forward movement of the screw, and the vertical axis represents screw position and screw torque.

FIG. 3A shows a case in which the check ring and other parts are not worn; FIG. 3B shows the case in which wear is present.

When the screw 1 moves forward and the check ring 3 closes, if the outer circumference of the check ring 3 is not worn, the check ring 3 is moved backward with respect to the screw 1 due to a viscous resistance applied to the check ring 3 by the resin present between the check ring 3 and the inner wall of the barrel 7.

On the other hand, if the outer circumference of the check ring 3 is worn, a larger clearance exists between the check ring 3 and the inner wall of the barrel 7. Accordingly, the viscous resistance due to the resin present between the check ring 3 and the inner wall of the barrel 7 is reduced and its effect to move the check ring 3 backward with respect to the screw 1 is weakened. Therefore, if the outer circumference of the check ring 3 is worn, the check ring 3 moves backward more slowly with respect to the screw 1 and closure of the check ring 3 is delayed. Since the resin pressure (injection pressure) continues to increase during the forward movement of the screw 1 (during injection), the screw torque due to resin backflow increases accordingly until the check ring 3 closes. When the check ring closes and stops the backflow through the resin path, there remains only a slight backflow through the gap between the check ring 3 and the inner wall of the barrel 7 and the screw torque is thereby reduced. Thus, the screw torque reaches its peak when the check ring 3 closes the resin path.

In FIGS. 3A and 3B, the peak screw torques Q1 and Q2 occur at times t1 and t2 and at screw positions X1 and X2, so Q1<Q2, t1<t2, and X1>X2 because the closure of the check ring 3 is delayed when the outer circumference of the check ring 3 is worn. Accordingly, the peak screw torque value and the time at the peak screw torque are greater when the outer circumference of the check ring 3 is worn than when it is not worn, and the screw position value is smaller when the check ring 3 is worn than when it is not worn.

In view of this, the elapsed time measured from the start of forward movement of the screw to the closure of the check ring (when the screw torque reaches its peak) can be used as an index of the amount of wear of the check ring 3. The distance the screw moves from the starting position of forward movement of the screw 1 to the position where the check ring closes can also be used as an index of the amount of wear of the check ring 3. The torque value when the screw torque reaches its peak (when the check ring closes) after the screw starts moving forward can also be used as an index of the amount of wear of the check ring 3.

The elapsed time from the start of forward motion of the screw until the check ring closes, the distance the screw moves forward, and the value of peak screw torque may be measured and stored before the check ring 3 is worn, and when the check ring wears down from molding operations, increases in these values may be measured and used as indices of the amount of wear. Since the resin pressure continues to increase during forward movement of the screw (during injection), the more the closure of the check ring 3 is delayed, the more the pressure at the closure of the check ring 3 increases. Accordingly, the difference between the resin pressure at the closure of the check ring 3 measured during forward movement of the screw 1 before the check ring 3 is worn and the resin pressure measured at the closure of the check ring 3 measured during forward movement of the screw 1 after the check ring 3 is worn can be used as an index of the amount of wear of the check ring.

If the end face of the check ring 3, the end face of the screw head 2 with which the check ring 3 is brought into contact, or the end face of the check seat 4 with which the check ring 3 is brought into contact is worn, then the check ring 3, which moves between the screw head 2 and the check seat 4 to open and close the resin path, must move a longer distance, and this takes a longer time. Thus, wear of the end face of the check ring 3, screw head 2, or check seat 4 increases the distance the check ring 3 needs to move and delays its closure, resulting in Q1<Q2, t1<t2, and X1>X2, as in the case where the check ring is worn and its outer diameter is reduced. Since the resin pressure at the time of closure of the check ring also increases when any one of these end faces is worn, the values of screw torque, time, and resin pressure at the peak of screw torque are greater than when the end faces are not worn, and the screw position value is smaller than when the end faces are not worn. As described above, the time elapsed from the start of forward movement of the screw to the closure of the check ring, the distance the screw moves forward, the peak screw torque value, and the resin pressure at the time of closure of the check ring can be used as indices of the amount of wear of the check ring.

In the above description, the clearance between the check ring and the inner wall of the barrel increases due to wear of the outer circumference of the check ring. The same phenomena also occur when the clearance between the check ring and the inner wall of the barrel increases due to wear of the inner wall of the barrel 7. The amount of wear of the inner wall of the barrel 7 can be determined in the same way from the time elapsed from the start of forward movement of the screw 1 to the closure of the check ring, the distance the screw has moved forward, the peak screw torque, and the resin pressure.

As described above, the states of wear of the screw head 2, check ring 3, check seat 4 (the screw head 2, check ring 3, and check seat 4 are referred to here as screw tip components) and the inner wall of the barrel can be estimated from the time elapsed from the start of forward movement of the screw to the closure of the check ring, the distance by which the screw moves forward, the peak screw torque, and the resin pressure at the closure of the check ring.

As explained above, as the screw torque increases in proportion to the resin pressure while the check ring 3 is open, the screw torque at the closure of the check ring increases. Simultaneously, the integral of the torque with respect to time or position up to the closure of the check ring 3 also increases. Accordingly, these integral values of the torque at the time of closure of the check ring 3 may be used as indices of the amount of wear of the check ring 3.

Figure 4:
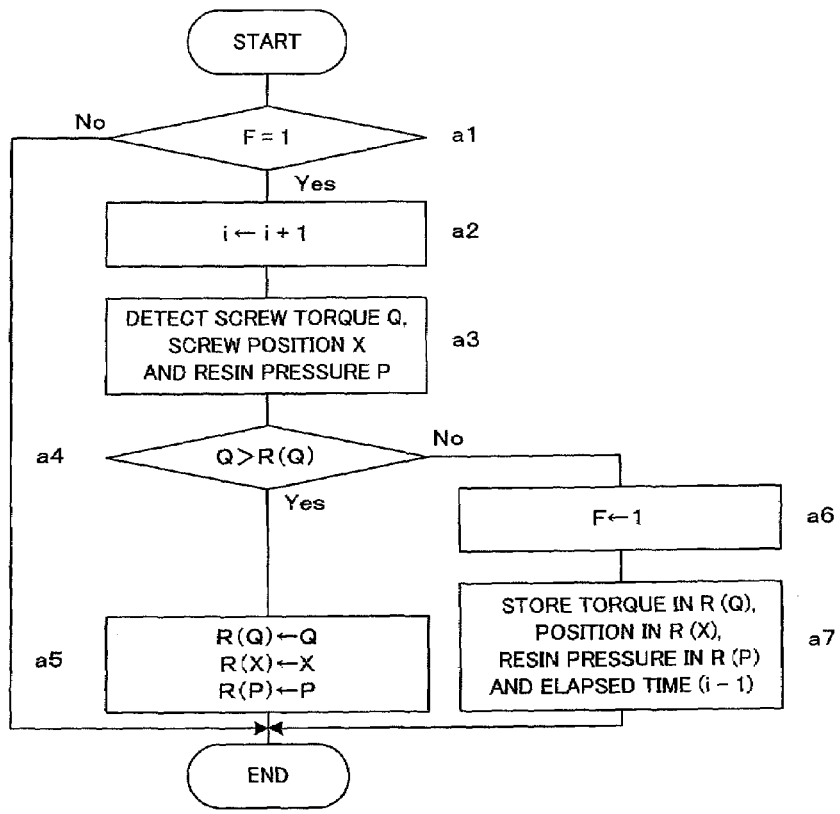
FIG. 4 is a flow chart illustrating a physical quantity detection algorithm used in the injection molding machine in the first embodiment of the present invention.
Figure 5:
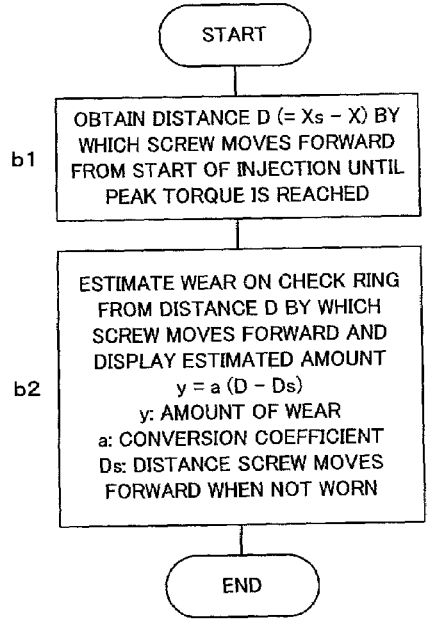
FIG. 5 is a flowchart illustrating a wear amount detection algorithm used in the injection molding machine in the first embodiment of the present invention.

FIG. 4 is a flowchart illustrating a physical quantity detection algorithm executed by the CNC CPU 22 at predetermined sampling intervals in the first embodiment. FIG. 5 is a flowchart illustrating a wear amount estimation algorithm in the first embodiment.

Before the injection and hold pressure process starts, the screw position Xs at the start of injection is read and stored in the current position register for storing the screw position. In addition, a register R(Q) for storing the screw torque Q, a register R(X) for storing the screw position X, and a register R(P) for storing a resin pressure P are cleared to '0', a sampling time index i is set to '0', a flag F indicating the detection of the closure of check ring is set to '0' (these registers, index, and flag are described below), and the processing shown in FIG. 4 is performed at predetermined sampling intervals during the injection and hold pressure process.

First, whether or not the flag is set to '1' is determined (Step a1). Since it is initially set at '0', control proceeds to Step a2 where the index i is incremented by one, and the screw torque Q obtained by the disturbance estimating observer incorporated in the processing performed by the servo CPU 25, the screw position X stored in the current position storage register, and the resin pressure (injection pressure) P detected by the pressure sensor 18 and input through the A/D converter to the servo CPU are detected (Step a3).

Whether or not the detected screw torque Q exceeds the screw torque Q stored in register R(Q) is then determined (Step a4). Since register R(Q) initially stores '0', the detected screw torque Q is greater than the screw torque Q stored in the register R(Q), and control proceeds to Step a5 where the screw torque Q, screw position X, and resin pressure P detected in Step a3 are stored in the registers R(Q), R(X), and R(P), respectively, to complete the processing for the current sampling cycle.

After injection starts, as the screw moves forward, the screw torque Q increases as shown in FIG. 3, so the detected screw torque Q continues to be greater than the torque stored in register R(Q), and control proceeds from Step a4 to Step a5 where registers R(Q), R(X), and R(P) are sequentially rewritten with the values detected during the current sampling cycle.

When the check ring 3 closes the resin path, the screw torque Q reaches its peak and then decreases as shown in FIG. 3. When the detected screw torque Q is determined to be below the screw torque stored in register R(Q) (the screw torque detected in the last sampling cycle) in Step a4, the check ring is determined to be closed, the flag F is set to '1' (Step a6), and the screw torque Q, screw position X, and resin pressure P stored in registers R(Q), R(X), and R(P), as well as the time elapsed from the start of injection until the check ring closed (which is obtained by multiplying (i−1) by the sampling period, where i is an index) are stored as physical quantities at the time of closure of the check ring (Step a7) to complete the processing for the current sampling cycle.

Since the flag F has been set to '1', in the next and following sampling cycles, the flag F is determined to be '1' in Step a1 and the sampling cycle ends with no other processing performed.

In the above example, the cycle in which the peak screw torque Q is detected is regarded as the time of closure of the check ring. Instead, the time when the screw torque Q starts to decrease, i.e., the sampling cycle in which Q>R(Q) is found in Step a4, may be regarded as the time of closure of the check ring. In this case, only the screw torque Q is detected in Step a3, only the screw torque Q is stored in the register R(Q) in Step a5, the screw position X and resin pressure P are detected in Step a7, and the detected screw position X and resin pressure P, the screw torque Q detected in Step a3, and the value of the index i are stored as physical quantities at the time of closure of the check ring.

When a wear estimation command is input, the CNC CPU 22 starts the wear estimation processing shown in FIG. 5. Alternatively, the wear estimation processing may be performed at the end of each injection and hold pressure process. In the first embodiment, the wear of the screw tip components or the inner wall of the barrel is estimated from the distance D the screw has moved forward.

First, the distance D the screw has moved forward is obtained. This is the difference between the screw position X detected at the time of closure of the check ring and stored in Step a7 and the screw position Xs stored at the start of injection (Step b1).

$$D = Xs - X$$

The wear y is calculated by the equation (1) below from the obtained distance of forward screw movement D and a preset distance of forward screw movement Ds which was measured when the screw tip components and the inner wall of the barrel were not worn. The calculated value of y is displayed on the display screen of the display-equipped input device 30 (Step b2) to complete this process.

$$y = a(D - Ds) \quad (1)$$

where a is a conversion coefficient.

In the above example, the distance of forward screw movement D is used as the physical quantity from which the wear is estimated. Instead, the elapsed time t from the start of injection to the closure of the check ring may be used as the physical quantity from which the wear is estimated. In this case, the index value (i−1) indicating the elapsed time obtained in Step a7 is multiplied by the sampling interval to obtain the elapsed time t, from which the preset elapsed time ts measured when the screw tip components and the inner wall of the barrel were not worn is subtracted. The subtraction result is then multiplied by a conversion coefficient to obtain the amount of wear and the result is displayed.

The peak screw torque Q or resin pressure P can also be used as the physical quantity from which the wear is estimated. In this case, the peak screw torque Qs or resin pressure Ps measured before the screw tip components and the inner wall of the barrel are worn is preset and subtracted from the peak screw torque Q or resin pressure P obtained in Step a7. The subtraction result is multiplied by a conversion coefficient to obtain the amount of wear and the result is displayed.

In the first embodiment described above, the value to be displayed as the amount of wear of the screw tip components and the inner wall of the barrel is obtained by subtracting the measured physical quantity (time elapsed from the start of forward movement of the screw to closure of the check ring, the distance the screw has moved forward, peak screw torque, or resin pressure) from the corresponding quantity measured before the screw tip components and the inner wall of the barrel were worn. Alternatively, the obtained physical quantities, i.e., the time elapsed from the start of forward movement of the screw to the closure of the check ring, the distance the screw has moved forward, peak screw torque, and resin pressure obtained in Step a7, may simply be displayed on the screen of the display-equipped input device 30 and an operator may be allowed to estimate the state of wear from the displayed physical quantities.

In the first embodiment described above, the physical quantities detected at the peak of screw torque are the peak screw torque itself and the screw position, elapsed time, and resin pressure occurring at the peak screw torque. Instead of these physical quantities, however, the screw torque may be integrated with respect to time or position from the start of forward motion of the screw to occurrence of the peak value, and the integrated values may be used as the physical quantities at the peak screw torque. In this case, the screw torque Q and screw position X are stored in each sampling cycle (screw torque Q and screw position X are stored in Step a3) until the peak screw torque is detected, the stored data are integrated, and the integrated values are displayed as indices of the amount of wear. Alternatively, the difference between the integrated values and the corresponding integrated values obtained when the check ring was not worn may be obtained and displayed to allow the state of wear to be estimated.

Next, a second embodiment of an injection molding machine having a screw equipped with a check ring according to the present invention will be described.

Figure 6A:
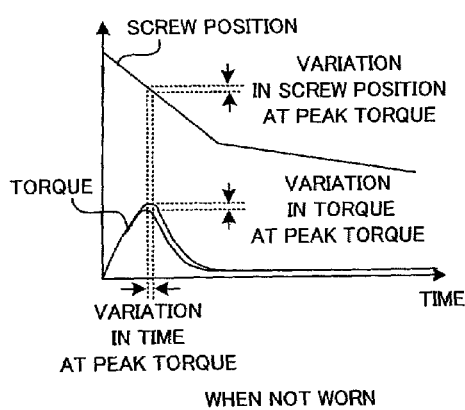
FIGS. 6A and 6B illustrate how the screw torque varies due to wear of screw tip components in the injection molding machine in the second embodiment of the present invention.
Figure 6B:
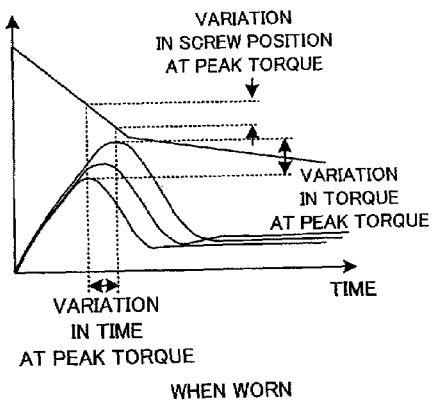

FIGS. 6A and 6B illustrate the principle used in the second embodiment to estimate the state of wear of the screw tip components and the inner wall of the barrel 7. As in FIGS. 3A and 3B, the horizontal axis is the time axis with the origin representing the starting point of forward movement of the screw, and the vertical axis represents screw position and screw torque. FIG. 6A shows a case in which the screw tip components and the inner wall of the barrel 7 are not worn; FIG. 6B shows the case in which they are worn.

As described in the first embodiment, the resistance between the check ring 3 and the inner wall of the barrel 7 is reduced when the outer circumference of the check ring 3 is worn. As a result, the contribution of the resistance between the check ring 3 and the inner wall of the barrel to the backward movement of the check ring 3 with respect to the screw 1 is reduced. Instead, the pressure difference between the front and back of the check ring 3 exerts a greater influence and this pressure difference causes the check ring to move backward.

Here, it should be noted that, as the check ring moves backward due to the difference in pressure in front of and behind it, the resin flow path inside the check ring is narrowed, and the front-back pressure difference increases. If the pressure difference between the front and back of the check ring is increased by some external factor during forward movement of the screw in a molding cycle, the backward movement of the check ring with respect to the screw is accelerated and the resin flow path is quickly narrowed, making the pressure difference between the front and back of the check ring increase still further. This further increase in the pressure difference accelerates the movement of the check ring and shortens the time until the check ring closes. In contrast, if there is a small pressure difference between the front and back of the check ring during forward movement of the screw in a molding cycle, backward movement of the check ring with respect to the screw is delayed, so the front-back pressure difference does not readily increase. If the pressure difference does not increase, it takes longer for the check ring to close.

As described above, when the check ring is worn and its outer diameter is reduced (or the inner wall of the barrel is worn and its inner diameter is enlarged), the check ring 3 moves backward more slowly, its closure is delayed, and in the forces that cause the check ring to move, the effect of the pressure difference between the front and back of the check ring 3 becomes relatively greater, and a slight change in the initial pressure difference between the front and back of the check ring becomes amplified in the course of closure of the check ring and significantly changes the time required for closing the check ring. Consequently, the closure timing of the check ring tends to vary.

When the end face of the check ring, screw head or check seat is worn, the closure of the check ring is also delayed as described above. The longer the time required for closing the check ring becomes, the more widely the closure timing of the check ring tends to vary.

This suggests that the wear of the screw tip components or inner wall of the barrel can be estimated from variations in the closure timing of the check ring.

FIG. 6A illustrates the state where the screw tip components and the inner wall of the barrel are not worn; FIG. 6B illustrates the state where the screw tip components and/or the inner wall of the barrel are worn. When they are not worn, variations in the peak value of screw torque, the time when the screw torque reaches its peak value (when the check ring is closed), and the position of the screw at that time are small. In the worn state, the peak value of the screw torque increases, the time when the screw torque reaches its peak value (when the check ring is closed) is delayed, and there are large variations in the peak value of screw torque, the time at which the screw torque reaches its peak (when the check ring is closed), and the screw position at that time, as shown in FIG. 6B. Large variations in the peak screw torque value also indicate large variations in the resin pressure at the peak screw torque.

Accordingly, the states of wear of the screw tip components and the inner wall of the barrel can be estimated from variations in these physical quantities.

In this case, as in the first embodiment, the processing shown in FIG. 4 is performed in each sampling cycle in the injection and hold pressure process. In the second embodiment, however, in Step a7, the physical quantities (peak screw torque, elapsed time, screw position, and resin pressure) at the peak of screw torque (at the closure of check ring) are stored cyclically in a memory capable of storing data for a plurality of cycles.

The state of wear is determined on the basis of the variations in the physical quantities stored over the plurality of cycles. For example, the standard deviation of the elapsed time from the start of injection to the closure of check ring may be calculated, and wear of the outer circumference of the check ring or the inner wall of the barrel may also be recognized when the standard deviation exceeds as predetermined value. The value of the standard deviation may be used as an index of the amount of wear of the outer circumference of the check ring. Alternatively, the standard deviation may be displayed to allow the amount of wear to be estimated. Instead of the standard deviation, the elapsed time range (maximum value minus minimum value) may be used. Other physical quantities can also be used. The standard deviations of the values of peak screw torque, screw position, and resin pressure, or the difference between the maximum and minimum values of these physical quantities, may be obtained over a plurality of molding cycles and displayed as indices of the amount of wear.

Next, a third embodiment of an injection molding machine having a screw equipped with a check ring according to the present invention will be described.

In the third embodiment, the state of wear of the outer circumference of the screw and the inner wall of the barrel is estimated from the screw torque after the screw torque reaches its peak (after the check ring is closed).

When the outer circumference of the check ring 3 or inner wall of the barrel is worn, resin backflow occurs between the outer circumference of the check ring 3 and the inner wall of the barrel even after the check ring 3 closes, due to the large clearance between the check ring and the inner wall of the barrel. A screw torque is produced in proportion to the rate of backflow. On the other hand, when the end face of the check ring 3, screw head, or check seat is worn, the rate of resin backflow after the closure of the check ring 3 is small and the torque is also small. Accordingly, the torque after the closure of the check ring 3 can be used to isolate the worn area to the outer circumference of the check ring 3 and estimate the degree of wear.

Figure 7A:
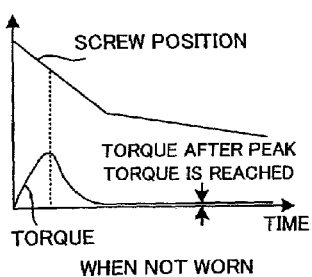
FIGS. 7A, 7B and 7C illustrate how the screw torque varies depending on the worn areas in the injection molding machine in the third and fourth embodiments of the present invention.
Figure 7B:
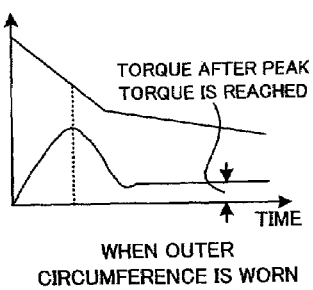
Figure 7C:
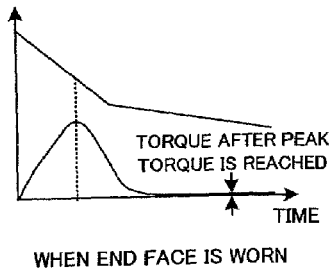

FIGS. 7A-7C show that differences in the screw torque after the peak of screw torque (after closure of the check ring) can be used to discriminate wear on the outer circumference of the check ring 3 or inner wall of the barrel 7 from wear on the end face of the check ring 3, screw head 2, or check seat 4.

FIG. 7A illustrates the screw torque when there is no wear; FIG. 7B illustrates the screw torque when the outer circumference of the check ring 3 or the inner wall of the barrel 7 is worn; and FIG. 7C illustrates the screw torque when the end face of the check ring 3, screw head 2, or check seat 4 is worn.

In FIG. 7B, in which the outer circumference of the check ring 3 or inner wall of the barrel 7 is worn, the time at which the screw torque reaches its peak (the check ring is closed) is obviously delayed as compared with the case in FIG. 7A. The screw torque and screw position at the peak are also greater than when there is no wear as shown in FIG. 7A. Resin backflow also occurs though the clearance between the outer circumference of the check ring 3 and the inner wall of the barrel 7, which is enlarged due to wear, producing a screw torque. On the other hand, when the end face of the check ring 3, screw head 2, or check seat 4 is worn, the time at which the screw torque reaches its peak (when the check ring is closed) is delayed as shown in FIG. 7C, but the backflow is small and substantially no screw torque is produced after the check ring is closed. Accordingly, the presence or absence of wear on the outer circumference of the check ring 3 or the inner wall of the barrel 7 can be estimated from the presence or absence of screw torque after the check ring is closed.

Figure 8:
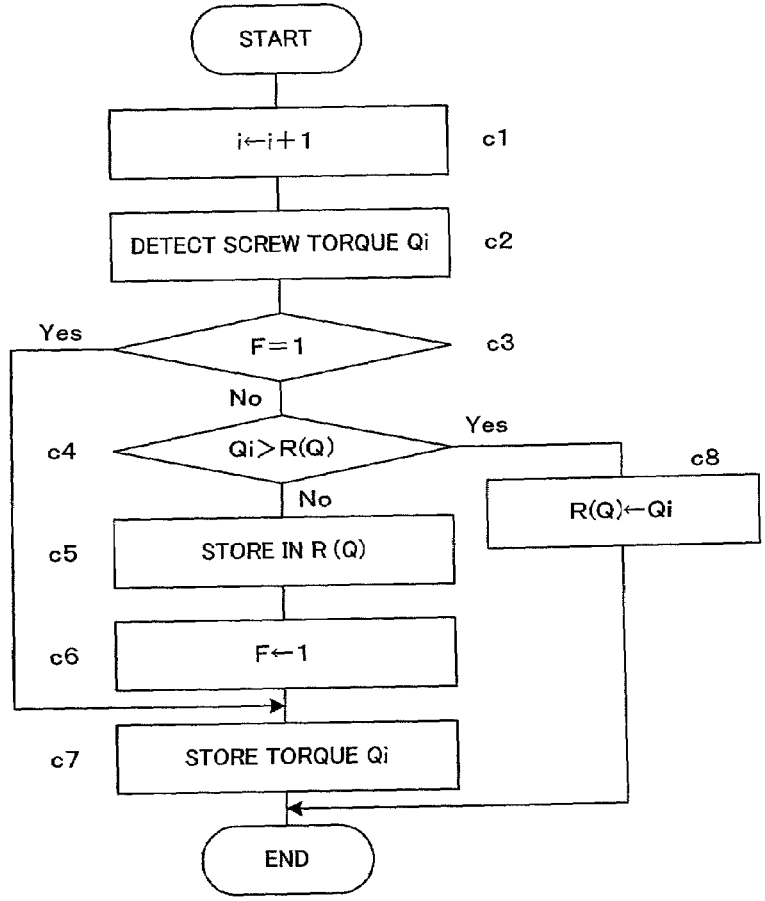
FIG. 8 is a flow chart illustrating a physical quantity detection algorithm used in the injection molding machine in the third embodiment of the present invention.
Figure 9:
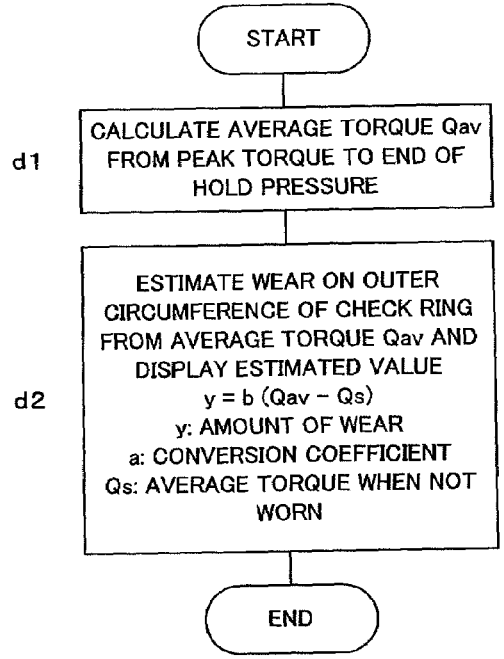
FIG. 9 is a flowchart illustrating a wear amount detection algorithm used in the injection molding machine in the third embodiment of the present invention.

FIG. 8 is a flow chart illustrating a physical quantity detection algorithm executed by the CNC CPU 22 at predetermined sampling intervals in the third embodiment. FIG. 9 is a flow chart illustrating a wear amount estimation algorithm in the third embodiment.

Before the injection and hold pressure process starts, the CNC CPU 22 sets the register R(Q) for storing the screw torque Q to '0', sets the index i indicating the sampling time to '0', and sets the flag F indicating closure of the check ring to '0'. Then the CNC CPU 22 performs the processing shown in FIG. 8 at predetermined sampling intervals during the injection and hold pressure process.

First, the index i is incremented by one (Step c1), and the screw torque Qi is obtained by the disturbance estimating observer incorporated in the processing performed by the servo CPU 25 (Step c2). Next, whether the flag F is set to '1' or not is determined (Step c3). Since the flag F has been initialized to '0', control proceeds to Step c4 where whether or not the obtained screw torque Qi exceeds the screw torque stored in the register R(Q) (Step c4) is determined. Since '0' is stored in register R(Q) and accordingly the detected screw torque Qi is greater than the screw torque Q stored in the register R(Q), control proceeds to Step c8 where the obtained screw torque Qi is stored in register R(Q) to complete the processing for the current sampling cycle.

Since the screw torque Q increases, as described above, as the screw moves forward after injection starts, the processing in Steps c1-c4 and Step c8 is performed in each sampling cycle so that the register R(Q) is sequentially rewritten with the detected screw torque Q.

On the other hand, after the check ring 3 closes the resin path, the screw torque decreases. When the detected screw torque Qi is determined to be below the screw torque stored in the register (the screw torque detected in the last sampling cycle) in Step c4, the check ring is determined to be closed, the screw torque to be stored in the register R(Q) is stored as the screw torque at the time of closure of the check ring (Step c5), flag F is set to '1' (Step c6), and the screw torque obtained in Step c2 is stored as the screw torque in the current sampling cycle (the screw torque in the first sampling cycle after the peak is detected) (Step c7), to complete the processing for the current sampling cycle.

In the next and following sampling cycles, the processing in Steps c1 and c2 is performed and the flag F is determined to be set to '1' in Step c3, so control proceeds to Step c7 where the screw torque Qi obtained in Step c2 is stored in memory to complete the processing for the current sampling cycle. Thereafter, until the injection and hold pressure process is completed, the processing in Steps c1, c2, c3, and c7 is performed in each sampling cycle, and the screw torque detected in each sampling cycle after the screw torque reaches its peak (after the check ring is closed) are stored in chronological order in memory.

In the above example, the sampling cycle in which the peak screw torque Q is detected is regarded as the time of closure of the check ring. If the time at which the screw torque Qi starts to decrease, i.e., the sampling cycle in which Qi>R(Q) is obtained in Step c4, is regarded as the time of closure of the check ring, the processing in Step c5 is not required.

When a wear amount estimation command is input, the CNC CPU 22 starts the wear amount estimation processing shown in FIG. 9. Alternatively, the wear amount estimation processing may be performed at the end of each injection and hold pressure process.

First, the screw torques Q obtained in the sampling cycles after the screw torque stored in memory reached its peak (after the check ring was closed) are averaged to obtain an average value Qav (Step d1). Then, the wear y is estimated by the equation (2) below from the average value Qav and a preset average value Qs measured before the screw tip components and the inner wall of the barrel were worn. The calculated amount of wear y is displayed on the screen of the display-equipped input device 30 (Step d2) to complete this processing.

$$y = b(Qav - Qs) \qquad (2)$$

where b is a conversion coefficient

In the third embodiment, the amount of wear of the screw tip components and the inner wall of the barrel are estimated using the above equation (2) and displayed, but the average obtained in Step d1 of the torque values detected from when the check ring closes until the screw finishes moving forward may be displayed instead as an index of the amount of wear of the screw tip components and the inner wall of the barrel.

Alternatively, the screw torque detected after the screw torque reaches its peak may be integrated, instead of averaged, and the integrated value may be displayed as an index of the amount of wear. As another alternative, the integrated or averaged value of the screw torque detected over a period starting a predetermined time after the screw torque reaches its peak and continuing until the screw finishes moving forward may be calculated and displayed as an index of the amount of wear. As yet another alternative, the amount of wear y may be estimated from this interval using an equation similar to equation (2) and y may be displayed.

The outer circumference of the check ring or the inner wall of the barrel may be determined to be worn when the average value Qav or the integrated value described above is greater than a predetermined value. For example, the torque at the time the screw finishes moving forward, the torque at the time of VP changeover (when the speed control is switched over to pressure control during the injection and hold pressure process), the torque after a predetermined time has elapsed since the torque reached its peak, or the torque at a predetermined screw position may be used to determine wear on the outer circumference of the check ring or the inner wall of the barrel. These values may be displayed as an index of the amount of wear of the screw tip components and the inner wall of the barrel.

Next, a fourth embodiment of an injection molding machine having a screw equipped with a check ring according to the present invention will be described.

Figure 10:
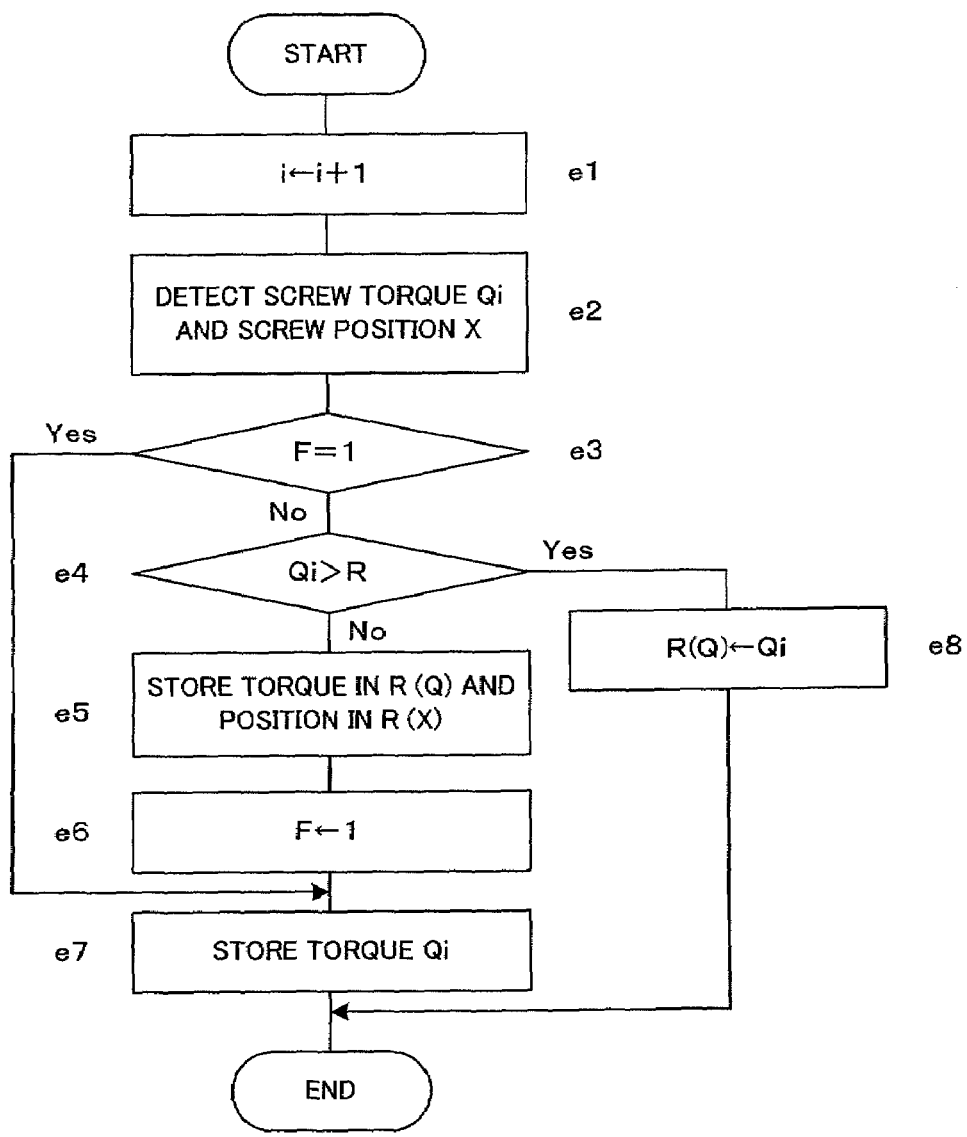
FIG. 10 is a flowchart illustrating a physical quantity detection algorithm used in the injection molding machine in the fourth embodiment of the present invention.
Figure 11:
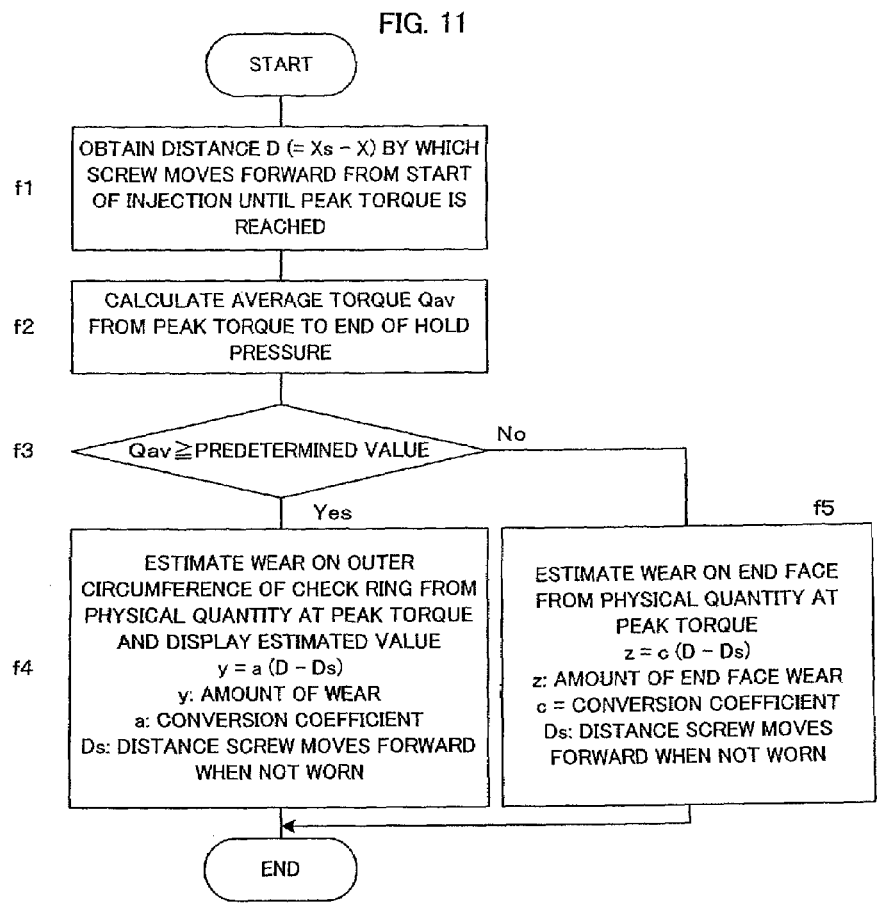
FIG. 11 is a flowchart illustrating a wear amount detection algorithm used in the injection molding machine in the fourth embodiment of the present invention.

FIG. 10 is a flowchart illustrating a physical quantity detection algorithm executed by the CNC CPU 22 at predetermined sampling intervals in the fourth embodiment. FIG. 11 is a flowchart showing a wear amount estimation algorithm in the fourth embodiment.

In the fourth embodiment, as in the third embodiment, the torque detected during the period from closure of the check ring until the screw finishes moving forward can be used to determine the amount of wear of the screw tip components, and to discriminate wear on the outer circumference of the check ring 3 or inner wall of the barrel 7 from the wear on the end face of the check ring 3, screw head 2, or check seat 4, and to estimate the amount of wear in the identified area.

FIG. 10 is a flowchart illustrating a physical quantity detection algorithm executed by the CNC CPU 22 at predetermined sampling intervals in the fourth embodiment. This processing is different from the processing shown in FIG. 8 in the third embodiment in that the screw position X is obtained, in addition to the screw torque Q, in each sampling cycle. In the fourth embodiment, in which the amount of wear is estimated from the distance the screw has moved forward, the screw position Xs at the start of injection is stored when the injection and hold pressure process starts.

Steps e1-e8 in FIG. 10 correspond to Steps c1-c8 in FIG. 8, but in Step e2 in FIG. 10, unlike Step c2 in FIG. 8, the screw position X is obtained in addition to the screw torque Q. In Step e5, the screw torque Q stored in the register is stored in memory as the peak screw torque value (the screw torque at the time of closure of the check ring) and the screw position X stored in the register at that time is also stored in memory. The other processing is the same as in FIG. 8 and will not be described in detail.

Next, when a wear amount estimation command is input, the CNC CPU 22 starts the wear amount estimation processing shown in FIG. 11. Alternatively, this wear amount estimation processing may be performed at the end of each injection and hold pressure process.

First, the distance D of forward movement of the screw (D=Xs−X) is obtained as the difference between the screw position X detected at the time of closure of the check ring and stored in Step e5 and the screw position Xs stored at the start of injection (Step f1). Next, the screw torque values Q obtained in each sampling cycle after the screw torque stored in memory in Step e7 reaches its peak (after the check ring is closed) are averaged to obtain an average value Qav (Step f2), and whether or not the average value Qav exceeds a preset value is determined (Step f3). An average value Qav greater than the preset value indicates the presence of resin backflow as shown in FIG. 7B, indicating wear on the outer circumference of the check ring 3 or inner wall of the barrel 7. Accordingly, control proceeds to Step f4. An average value Qav below the predetermined value indicates a small backflow, indicating that the outer circumference of the check ring 3 and inner wall of the barrel 7 are not worn. Accordingly, control proceeds to Step f5.

In Step f4, the calculation in the equation (3) below is performed to obtain and display the amount of wear y. More specifically, the amount of wear y is estimated by taking the difference between the distance D (=Xs−X) and the preset distance Ds of forward movement of the screw, measured before the screw tip components and the inner wall of the barrel were worn, and then multiplying the obtained difference by a conversion coefficient a, and the estimated wear y is displayed on the screen of the display-equipped input device 30 to complete the processing.

$$y=a(D-Ds) \tag{3}$$

In Step f5, the amount of wear z is calculated by the equation (4) below and displayed. More specifically, the amount of wear y on the end face is estimated by taking the difference between the distance D of forward movement of the screw (D=Xs−X) and the preset distance of forward movement of the screw measured before the screw tip components and the inner wall of the barrel were worn and then multiplying the calculated difference by a conversion coefficient c, and the wear y is displayed in the screen of the display-equipped input device 30 to complete the processing.

$$z=c(D-Ds) \tag{4}$$

In the fourth embodiment, the amount of wear is estimated from the distance D the screw has moved forward, but other physical quantities may also be used to estimate the amount of wear. The elapsed time from the start of injection until the check ring is closed may be used as the physical quantity for estimating the wear. In this case, one is subtracted from the value of the index i indicating the number of sampling cycles stored in Step e5 to obtain the sampling time at which the screw torque reaches its peak. Then, the subtraction result (i−1) is multiplied by the number of sampling cycles to obtain the elapsed time t, from which the preset elapsed time ts measured before the screw tip components and the inner wall of the barrel were worn is subtracted. The subtraction result is multiplied by a conversion coefficient to obtain the amount of wear to be displayed.

The peak value of screw torque Q may be used as the physical quantity for estimating the state of wear. In this case, the peak screw torque value Qs measured before the screw tip components and barrel inner wall were worn is set in advance and subtracted from the peak screw torque value Q obtained in Step e5. The subtraction result is multiplied by a conversion coefficient to obtain the amount of wear to be displayed.

The resin pressure P may be used as the physical quantity for estimating the state of wear. In this case, the resin pressure Ps measured before the screw tip components and the inner wall of the barrel were worn is set in advance, the resin pressure P is obtained in Step e2 and stored in register R(P) in Step e8, the resin pressure P to be stored in register R(P) is stored as the resin pressure at peak screw torque in Step e5, and the resin pressure Ps measured before the screw tip components and the inner wall of the barrel were worn is subtracted from the resin pressure P. The subtraction result is then multiplied by the conversion coefficient to obtain the amount of wear to be displayed.

If the sampling cycle in which the detected torque Q is smaller than the screw torque stored in the register R(Q) is regarded as the time when the screw torque reaches its peak (when the check ring is closed), then when the screw position X or resin pressure P is detected and stored in Step e5, the index i is also stored, and the amount of wear is estimated from the stored screw position X or resin pressure P and the index i.

Although the above embodiments are directed to estimation of the states of wear of the check ring and the inner wall of the barrel, the present invention is also applicable to detection of wear on a screw flight or plunger in a plunger type injection molding machine. Generally speaking, the present invention is applicable to detection of wear on a injection component which injects resin by moving forward inside the cylinder.

Figure 12A:
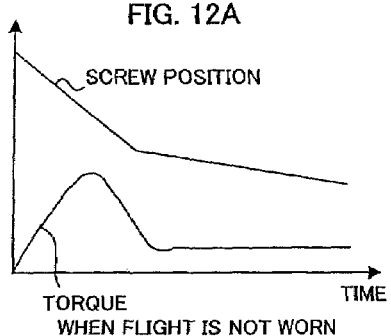
FIGS. 12A and 12B illustrate how screw torque varies due to wear of the screw flight.
Figure 12B:
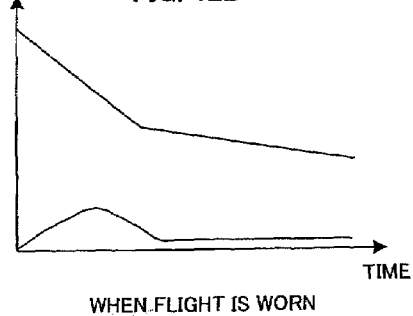

FIGS. 12A and 12B illustrate how the screw torque varies due to wear of the screw flight. FIG. 12A shows screw torque when the flight is not worn; FIG. 12B shows screw torque when the flight is worn. When the flight is not worn, the pressure due to resin backflow during forward movement of the screw acting on the flight produces a screw torque greater than is produced when the flight is worn. As the flight becomes lower due to wear, resin backflow still occurs during forward movement of the screw, but the torque acting on the screw is reduced. Accordingly, wear on the screw flight can be estimated from the magnitude of the torque acting on the screw during forward movement. The embodiment is applicable to a screw having a check ring and also to a screw having no check ring.

Although the embodiments described above are directed to the detection and estimation of wear of parts inside the barrel in an injection molding machine of the in-line screw type, the present invention is also applicable to injection molding machines of the plunger type.

Figure 13A:
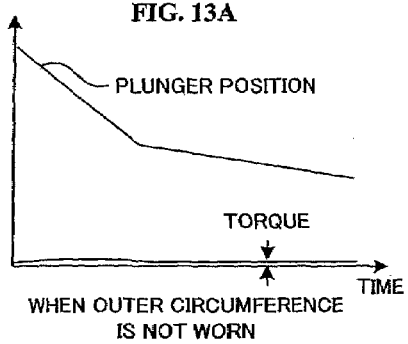
FIGS. 13A and 13B illustrate how plunger torque varies due to wear of a plunger which has a flight.
Figure 13B:
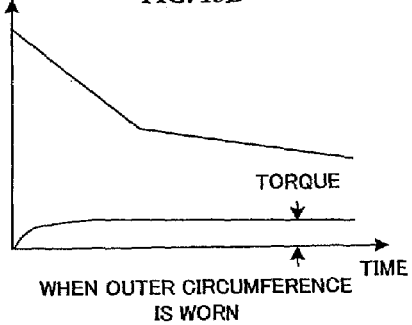

Here, detection of wear on a plunger in a plunger type injection molding machine is explained below. To apply the present invention to such an injection molding machine, flight grooves are formed by machining at the rear of an ordinary flightless plunger to detect backflow and a torque detector is provided to the plunger, so that wear on the outer circumference of the plunger can be estimated. FIGS. 13A and 13B illustrate variations in plunger torque due to wear on a plunger with machined flight grooves. FIG. 13A shows the torque detected during forward movement of a plunger that is not worn; FIG. 13B shows the torque detected during forward movement of a plunger that is worn. Resin backflow that occurs when the plunger moves forward applies torque to the plunger. This torque is small when the plunger is not worn. As the outer circumference of the plunger is worn, the backflow increases. Accordingly, wear on the outer circumference of the plunger can be estimated from the torque during forward movement of the plunger.

In the above embodiments, the wear state of the screw tip components and screw is estimated from the screw torque, or the physical quantities, such as the screw position, screw torque, time elapsed from the start of injection, and resin pressure, at the time of peak screw torque are displayed to allow the state of wear to be estimated. Alternatively, the increase of wear up to the present time can be estimated by storing the physical quantities at peak screw torque in each molding cycle. The increase of wear in the future can also be predicted from the current degree of wear and the increase of wear up to the present time.

It is also possible to establish a correspondence between the physical quantities and the amount of check ring wear. To do this, when the check ring is worn to some extent, the physical quantities at peak screw torque are stored, the barrel is disassembled, the size of the check ring is measured, and the amount of wear is stored. Once this procedure is carried out, the amount of wear (size) of the check ring can be obtained directly from the physical quantities at peak screw torque as long as the same molding conditions are used for production.

It is also possible to establish a correspondence between the physical quantities and the amount of check ring wear by mounting check rings of known size and storing the physical quantities at the peak torque.

The above embodiments are adapted to enable the state of wear of the screw tip components and so on to be displayed and estimated in the injection and hold pressure process, but the embodiments of the present invention described above can also be applied to the closing process of the check ring by forward movement of the screw during the period from the completion of metering until the injection and hold pressure process starts, to display and estimate the state of wear of the screw tip components and so on.

In the above embodiments, an electric servo motor is used as a rotational driving means for rotating the screw, but any other type of electric motor or a hydraulic motor may be used instead. In the above embodiments, an electric servo motor is used as the axial driving means for driving the screw in its axial direction and controlling injection and back pressure, but another type of electric motor or a hydraulic mechanism such as a hydraulic cylinder may be used instead.

In the above embodiments, as the torque detecting means for detecting screw torque, an "observer" is provided in the servo motor control circuit that rotates the screw, and the "observer" calculates the rotational load, that is, the torque, applied to the screw, but the torque may be detected from the motor driving current, or if a hydraulic motor is used, the screw torque may be detected from its hydraulic pressure. Furthermore, a strain sensor may be mounted on the screw to detect the torque acting on the screw.

What is claimed is:

1. An injection molding machine having a screw equipped with a check ring, torque detecting means for detecting torque acting on the screw, and physical quantity detecting means for detecting a physical quantity related to injection molding, the injection molding machine comprising:

peak time detecting means for detecting a time at which the torque acting on the screw detected by the torque detecting means reaches a peak during forward movement of the screw; and wear state estimating means for estimating a state of wear of a screw tip component and/or a state of wear of an inner wall of a barrel in which the screw is inserted from the physical quantity detected by the physical quantity detecting means at the time of the peak of the torque detected by the peak time detecting means.

2. The injection molding machine having a screw equipped with a check ring according to claim 1, wherein the wear state estimating means calculates statistical variation, over predetermined molding cycles, in the physical quantity at the time of the peak of the torque acting on the screw and estimates the state of wear of the screw tip components and/or the inner wall of the barrel on the basis of the variation.

3. An injection molding machine having a screw equipped with a check ring and torque detecting means for detecting torque acting on the screw, the injection molding machine comprising:

peak time detecting means for detecting a time at which the torque acting on the screw detected by the torque detecting means reaches a peak during forward movement of the screw; and wear state estimating means for estimating a state of wear of the outer circumference of the check ring and/or a state of wear of an inner wall of a barrel on the basis of torque detected from detection of the peak of the torque by the peak time detecting means until the screw finishes moving forward.

4. The injection molding machine having a screw equipped with a check ring according to claim 3, further comprising:

physical quantity detecting means for detecting a physical quantity related to injection molding;

wherein, when the torque from occurrence of the peak of the torque until the screw finishes moving forward is equal to or higher than a predetermined value, the wear state estimating means determines that wear on the outer circumference of the check ring and/or the inner wall of the barrel has increased and estimates the state of wear of the outer circumference of the check ring and/or the inner wall of the barrel on the basis of the physical quantity detected by the physical quantity detecting means at the time of the peak of the torque, and if the torque from occurrence of the peak of the torque until the screw finishes moving forward is lower than the predetermined value, the wear state estimating means determines that wear on the end face of the check ring and/or the end face of the screw head has increased and estimates the state of wear of the end face of the check ring and/or the end face of the screw head on the basis of the physical quantity detected by the physical quantity detecting means at the time of the peak of the torque.

5. An injection molding machine having a screw equipped with a check ring, including a screw equipped with a check ring, torque detecting means for detecting torque acting on the screw, and physical quantity detecting means for detecting a physical quantity related to injection molding, the injection molding machine comprising:

peak time detecting means for detecting a time at which the torque acting on the screw detected by the torque detecting means reaches a peak during forward movement of the screw; and display means for displaying the physical quantity detected by the physical quantity detecting means at the time of peak torque detected by the peak time detecting means.

6. The injection molding machine having a screw equipped with a check ring according to claim 5, further comprising:

calculating means for calculating statistical variation, over predetermined molding cycles, in the physical quantity at the time of the peak of the torque;

wherein the display means displays the calculated variation.

7. An injection molding machine having a screw equipped with a check ring, including a screw equipped with a check ring and torque detecting means for detecting a torque acting on the screw, the injection molding machine comprising:

peak time detecting means for detecting a time at which the torque acting on the screw detected by the torque detecting means reaches a peak during forward movement of the screw;

value obtaining means for obtaining at least one of an average value of the torque detected from detection of the peak of the torque until the screw finishes moving forward, an integrated value of the torque detected from detection of the peak of the torque until the screw finishes moving forward, a torque after a predetermined time has elapsed from occurrence of the peak of the torque, a torque when the screw has moved forward a predetermined distance after the peak of the torque, and a torque when the screw finishes moving forward; and display means for displaying the value obtained by the value obtaining means.

8. The injection molding machine having a screw equipped with a check ring according to claim 1, wherein the physical quantity detecting means is a means for detecting screw position; and wherein the physical quantity is the screw position or the distance the screw moves from the point at which the screw starts moving forward until the point of the peak of the torque.

9. The injection molding machine having a screw equipped with a check ring according to claim 1, wherein the physical quantity detecting means is for detecting elapsed time; and wherein the physical quantity is the elapsed time from the time the screw starts moving forward to the time the peak of the torque is detected.

10. The injection molding machine having a screw equipped with a check ring according to claim 1, wherein the physical quantity detecting means is a means for detecting torque; and wherein the physical quantity is torque, or torque integrated with respect to time from the time at which the screw starts moving forward until the time of the peak of the torque.

11. The injection molding machine having a screw equipped with a check ring according to claim 1, wherein the physical quantity detecting means is a means for detecting torque; and wherein the physical quantity is torque integrated with respect to screw position from the point the screw starts moving forward to the point of the peak of the torque.

12. The injection molding machine having a screw equipped with a check ring according to claim 1, wherein the physical quantity detecting means is a means for detecting resin pressure; and wherein the physical quantity is resin pressure.

13. An injection molding machine, comprising:

an injection member which has a flight and injects resin by moving forward inside a cylinder;

torque detecting means for detecting torque acting on said injection member; and wear state estimating means for estimating a state of wear of the outer circumference of the injection member and/or a state of wear of an inner wall of the barrel from the torque detected by the torque detecting means;

wherein the torque detecting means is adapted to detect the torque acting on the injection member during forward movement of the injection member.

14. The injection molding machine according to claim 13 wherein said injection member is a plunger.

15. The injection molding machine according to claim 13 wherein said injection member is a screw.

16. The injection molding machine having a screw equipped with a check ring according to claim 1, wherein said screw tip component involves a screw head, the check ring, and a check seat in combination with the check ring.

* * * * *